United States Patent [19]

Daniels et al.

[11] 4,410,962

[45] Oct. 18, 1983

[54] MAILING SYSTEM INTERFACE INTERCONNECTING INCOMPATIBLE COMMUNICATION SYSTEMS

[75] Inventors: Edward P. Daniels, Bridgeport; Daniel F. Dlugos; Earl B. Holtz, both of Huntington; Flavio M. Manduley, Woodbury, all of Conn.

[73] Assignee: Pitney Bowes Inc., Stamford, Conn.

[21] Appl. No.: 235,281

[22] Filed: Feb. 17, 1981

[51] Int. Cl.³ ............... G06F 15/20; G01G 23/42
[52] U.S. Cl. ........................ 364/900; 364/466; 177/25
[58] Field of Search ... 364/200 MS File, 900 MS File, 364/464, 466; 177/25

[56] References Cited

U.S. PATENT DOCUMENTS 3,909,799  9/1975  Recks et al. ................. 364/200
4,286,325  8/1981  Dlugos et al. ................ 364/900

*Primary Examiner*—Raulfe B. Zache
*Attorney, Agent, or Firm*—Robert H. Whisker; David E. Pitchenick; William D. Soltow, Jr.

[57] ABSTRACT

An automated mailing system includes a postage value determining system processor, a scale for providing weight indicative signals, a keyboard for operator entry of information relating to a determination of postage, and a plurality of peripheral devices. A peripheral controller interface establishes communications links with the peripheral devices. An incompatible systems interface interconnects a serial communications bus of the system processor and the peripheral controller interface. The incompatible systems interface includes a processor programmed to receive, decode and transmit information from or to the system processor along the serial bus and load or receive information from or to the peripheral controller interface along parallel lines. The communication timing constraints of the serial communications bus for receipt of data signals by the system processor do not permit monitoring of the data transmission by the incompatible systems processor. To accommodate for such timing constraints, system clock pulses of the serial bus are employed at a flip-flop to disable the incompatible systems processor.

10 Claims, 7 Drawing Figures various devices including a postage value determining system and a peripheral controller interface communicating with incompatible peripheral devices.

MAILING SYSTEM INTERFACE INTERCONNECTING INCOMPATIBLE COMMUNICATION SYSTEMS

RELATED APPLICATIONS

In a copending application of Daniel F. Dlugos entitled Multiprocessor Parcel Postage Metering System Having Serial Data Bus, Ser. No. 13,734, filed Feb. 21, 1979 and assigned to the assignee of the present invention, a postage value determining system processor which communicates along a serial data bus with various subsystem processors is disclosed. The present invention is directed to an interface adapted to interconnect such serial data bus with a plurality of peripheral devices which are not compatible with the system processor.

Communications to and from the peripheral devices are channeled through a controller interface which is constructed in accordance with a copending application of Daniel F. Dlugos et al entitled Postage Scale Peripheral Interface, Ser. No. 235,241, filed Feb. 17, 1981 and assigned to the assignee of the present invention.

The peripheral interface established communications links with selected peripheral devices in accordance with an Echoplex communications protocol disclosed in a further copending application of John H. Soderberg et al entitled Electronic Postage Meter Having Plural Computing Systems, Ser. No. 89,413, filed Oct. 30, 1979, issued as U.S. Pat. No. 4,301,507, Nov. 17, 1981, and assigned to the assignee of the present invention.

BACKGROUND OF THE INVENTION

1. Field of the Invention

This invention relates generally to automated mailing systems which include a postage value determining system processor interconnected to a postage scale and various peripheral devices including a postage meter. More particularly, the present invention is directed to a systems interface which facilitates communications between a system processor adapted for communication with subsystem processors along a serial data bus and a peripheral controller interface adapted to communicate with a system processor along parallel lines.

2. Brief Description of the Prior Art

Various devices and systems have been developed to assist in determining the proper postage for mailing articles. Among the simplest was a manually operated scale which provided a visual indication of the article weight. An operator was required to refer to printed postal rate charts and special fee charts employing the weight reading as well as destination and class of service for a determination of the amount of postage to be applied. It should be appreciated that this technique was time consuming and susceptible to many operator introduced errors especially in conjunction with volume mailing operations.

In order to reduce a potential source of human introduced errors, various machines have been proposed. Illustrated in U.S. Pat. No. 3,692,988, issued to Dlugos et al. on Dec. 9, 1972 and assigned to the assignee of the present invention, is a typical example. In this patent, a parcel postage metering system employed both electromechanical and electronic technology to generate postage representing signals as a function of the desired class of service, a zone and a parcel weight input. A system processor calculated the appropriate transportation charges by reference to a look-up table stored in a rate memory.

The development of automated mailing systems led to the independent development of peripheral devices to be employed in conjunction with system processors. For example, meter setting devices have been developed for moving the postage setting levers of postage meters. Such meter setting devices were controlled by individual processors.

Electronic postage meters which did not require meter setting devices were also developed. A typical electronic postage meter was disclosed in U.S. Pat. No. 3,978,457, entitled Microcomputerized Electronic Postage Meter System, issued Aug. 31, 1976 to Frank P. Check, Jr. et al. and also assigned to the assignee of the present invention. Further peripheral devices employed in conjunction with mailing systems included printers, accounting systems, and computer interfaces.

As a result of independent development of various peripheral devices, postage value determining system processors were capable of communication with only selected peripheral devices having a compatible communications protocol. Thus, a potential purchaser of a particular mailing system including a desired scale having a system processor would not be able to select many of the available peripheral devices due to the incompatibility of the communications system employed by the peripherals.

SUMMARY OF THE INVENTION

An interface is adapted to interconnect a postage value determining system processor which communicates with peripheral devices along a serial data bus and a peripheral controller interface which is programmed to communicate with a different system processor along parallel lines.

The incompatible systems interface communicates with the system processor along the serial data bus in simulation of communications between the system processor and a postage printer subsystem processor of a meter setting device and/or a peripheral subsystem processor. Communications between the incompatible systems interface and a peripheral controller interface is in simulation of communications between the peripheral controller interface and a compatible postage value determining system processor.

The incompatible systems interface includes a processor, suitable signal buffers and latches, as well as working and program memories. The processor is programmed to receive data and commands from the system processor through a serial communications bus and to transmit data to the system processor along the serial bus.

From the above compendium, it will be appreciated that it is an object of the present invention to provide a mailing systems communications interface of the general character described which is not subject to the disadvantages of the prior art aforementioned.

A further object of the present invention is to provide a communications interface of the general character described between a postage value determining system processor which is constructed for communication with peripheral devices along a serial bus and a plurality of mailing system peripheral devices which are not constructed for communication with a system processor along a serial bus.

Another object of the present invention is to provide an interface of the general character described between a postage value determining system processor which communicates with peripheral devices and a peripheral controller interface which is adapted to communicate with a postal value determining system processor having an incompatible communications protocol.

A further object of the present invention is to provide a mailing system interface of the general character described which permits the selection of otherwise incompatible peripheral devices.

A still further object of the present invention is to provide an automated mailing system of the general character described which includes a postage value determining system processor interconnected to an incompatible peripheral device through an interface.

Another object of the present invention is to provide a mailing system interface of the general character described which facilitates upgrading, downgrading, or otherwise modifying peripheral devices of an existing mailing system having a system processor without requiring reprogramming of the system processor.

A further object of the present invention is to provide a mailing system interface of the general character described which facilitates simplified, low cost modification of mailing systems having system processors.

Other objects of the invention in part will be obvious and in part will be pointed out hereinafter.

With these ends in view, the invention finds embodiment in certain combinations of elements, arrangements of parts and series of steps by which the aforementioned objects and certain other objects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figure 1:
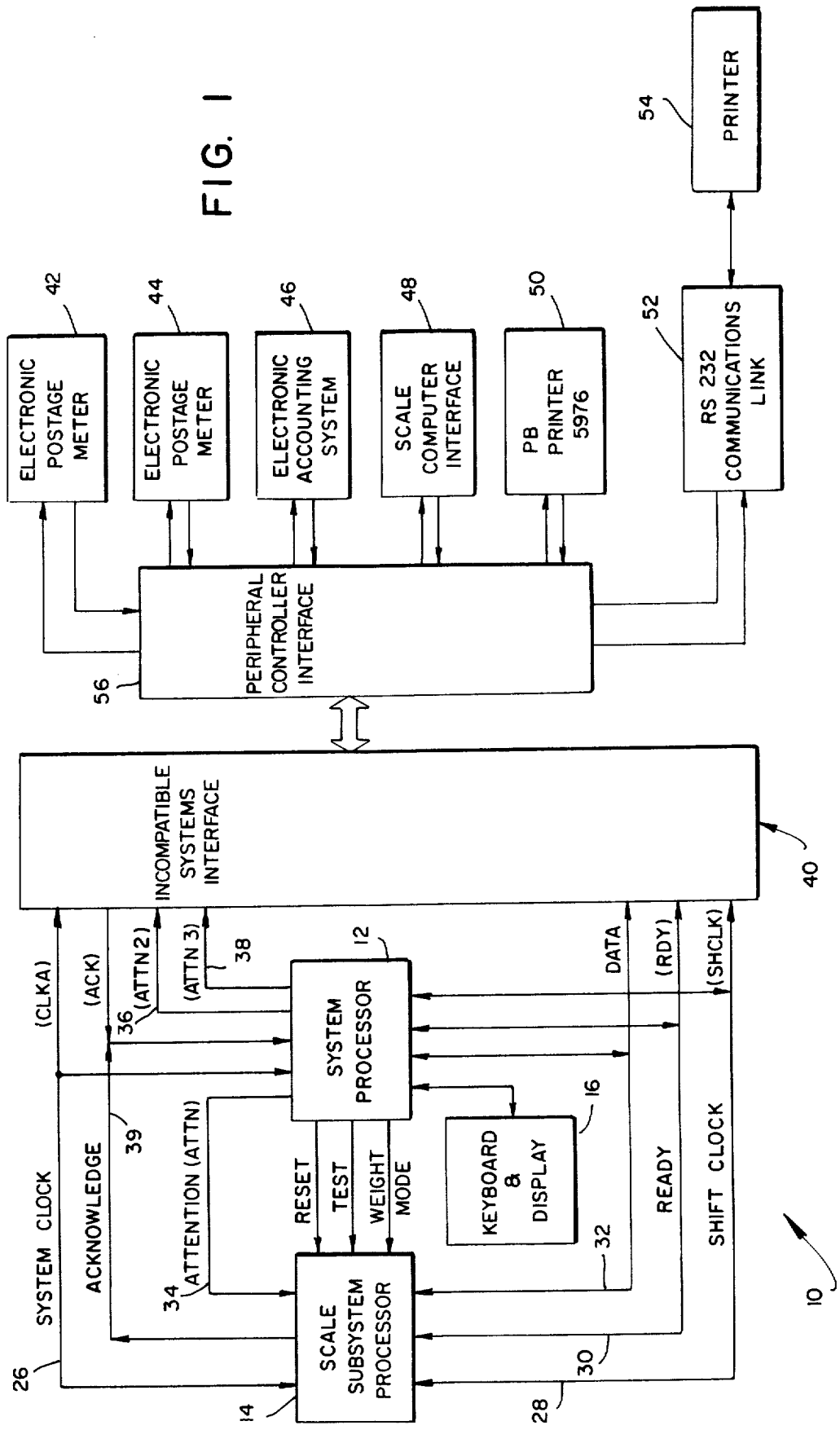
FIG. 1 is a schematized block diagram of a typical automated mailing system employing an incompatible systems interface in accordance with the present invention and illustrating the incompatible systems interface interconnecting a postage value determining system processor which communicates along a serial bus to a peripheral controller which in turn establishes communications links with various mailing system peripheral devices.

Referring now in detail to the drawings, the reference numeral 10 denotes generally a typical automated mailing system embodying the present invention. The mailing system 10 includes a postage value determining system processor 12 which computes transportation charges for an article as a function of article weight, class of transportation and, with respect to certain classes, distance to its destination.

A scale and an associated scale subsystem processor 14 generate a signal indicative of the weight of the article to be transported. The data necessary for determination of the article transportation charges, e.g. destination operands, class of transportation operands, etc., are entered at a keyboard 16 having an associated display for indicating keyboard and calculated information.

The system processor 12 may comprise a PPS-4/1 one chip microcomputer, MM 76 Series, available from Rockwell International Corporation of Anaheim, Calif. The scale subsystem processor 14 may comprise a Rockwell MM-78 Series microcomputer. Communications between the system processor, the scale subsystem processor 14 and associated peripheral devices extend along a common shared bus system. Such communications system is described in the copending related application entitled Multiprocessor Parcel Postage Metering System Having Serial Data Bus, Ser. No. 13,734, issued as U.S. Pat. No. 4,308,579, Dec. 29, 1981, and incorporated herein by reference.

As more fully described in the copending application Ser. No. 13,734, communications between the system processor 12 and various subsystem processors are controlled by system clock signals (CLKA) generated within the system processor 12 which are applied to the various processors of the entire mailing system 10 over a common clock line 26. In addition, a shift clock signal (SHCLK) is generated by the system processors and is transmitted along a shift clock line 28. Further connections from the system processor 12 which are common to the other processors as set forth in the said copending application are a ready (RDY) signal line 30 and a serial data line 32.

Communications between processors are controlled by the system processor 12 which, operated under the control of a stored program, addresses a desired subsystem processor of either the scale or a selected peripheral by means of an attention signal. An attention (ATTN 2) line 34 interconnects the system processor 12 and the scale subsystem processor 12; an ATTN 2 line 36 is employed when the system processor desires to address a meter setting device, and an ATTN 3 line 38 is employed when the system processor 12 desires to communicate with a peripheral subsystem processor. The various subsystem processors transmit an acknowledge signal (ACK) along a common shared acknowledge line 39 in response to receipt of an attention signal.

In accordance with the present invention, an incompatible systems interface 40 permits communications between the system processor 12 and a plurality of otherwise incompatible peripheral devices such as one or more electronic postage meters 42, 44. The meter 42 is adapted to print United States Postal Service postage denominations, while the meter 44 is adapted to print private carrier transportation charges, e.g. United Parcel Service.

Electronic postage meters of this general type are described in U.S. Pat. No. 3,978,457, entitled Microcomputerized Electronic Postage Meter System, incorporated herein by reference. Additional electronic postage meters of this type include the electronic postage meter disclosed in the copending application Ser. No. 89,413. The electronic postage meters 42, 44 are programmed for communication pursuant to the communications routine disclosed in the related copending application Ser. No. 89,413. Such communications routine is serial character asynchronous, bit synchronous, in message form with the bits of the message being timed in accordance with a given schedule. The messages are returned or echoed by the recipient, bit by bit for checking. This communications routine has been designated "Echoplex".

A further mailing system peripheral device which may be employed and which is programmed for communication utilizing the Echoplex routine and protocol is an electronic accounting system 46. Additionally, a computer interface 48 and a Pitney Bowes Model 5976 printer 50 may be employed, both of which communicate through the Echoplex routine.

A peripheral link 52 may be provided for communication through an RS 232 hardware standard. The RS 232 communications link 52 could interface with one of several available RS 232 printers 54 or any other desirable peripheral device which communicates with ASCII code for example.

Communications links to and from the peripheral devices 42 through 54 are established through a peripheral controller interface 56 constructed in accordance with the copending related application of Daniel F. Dlugos et al. entitled Postage Scale Peripheral Interface and incorporated herein by reference.

As more fully described in the said copending application entitled Postage Scale Peripheral Interface, the peripheral controller interface 56 includes a microcomputer which establishes a multiplexed communications link with a selected peripheral device in response to command signals from a compatible system processor such as an Intel 8085 processor available from Intel Corporation of Santa Clara, Calif. The communications subroutines of the microcomputer include signal transmission and/or receipt, temporary storage of data received for communication to and from a peripheral device and communication with a system processor.

It should be appreciated that the interface 56 is not compatible for communication with the serial bus system of the system processor 12. In order to employ the peripheral devices 42 through 54 with the serial bus communications system, the incompatible systems interface 40 in accordance with the present invention has been devised.

Figure 2A:
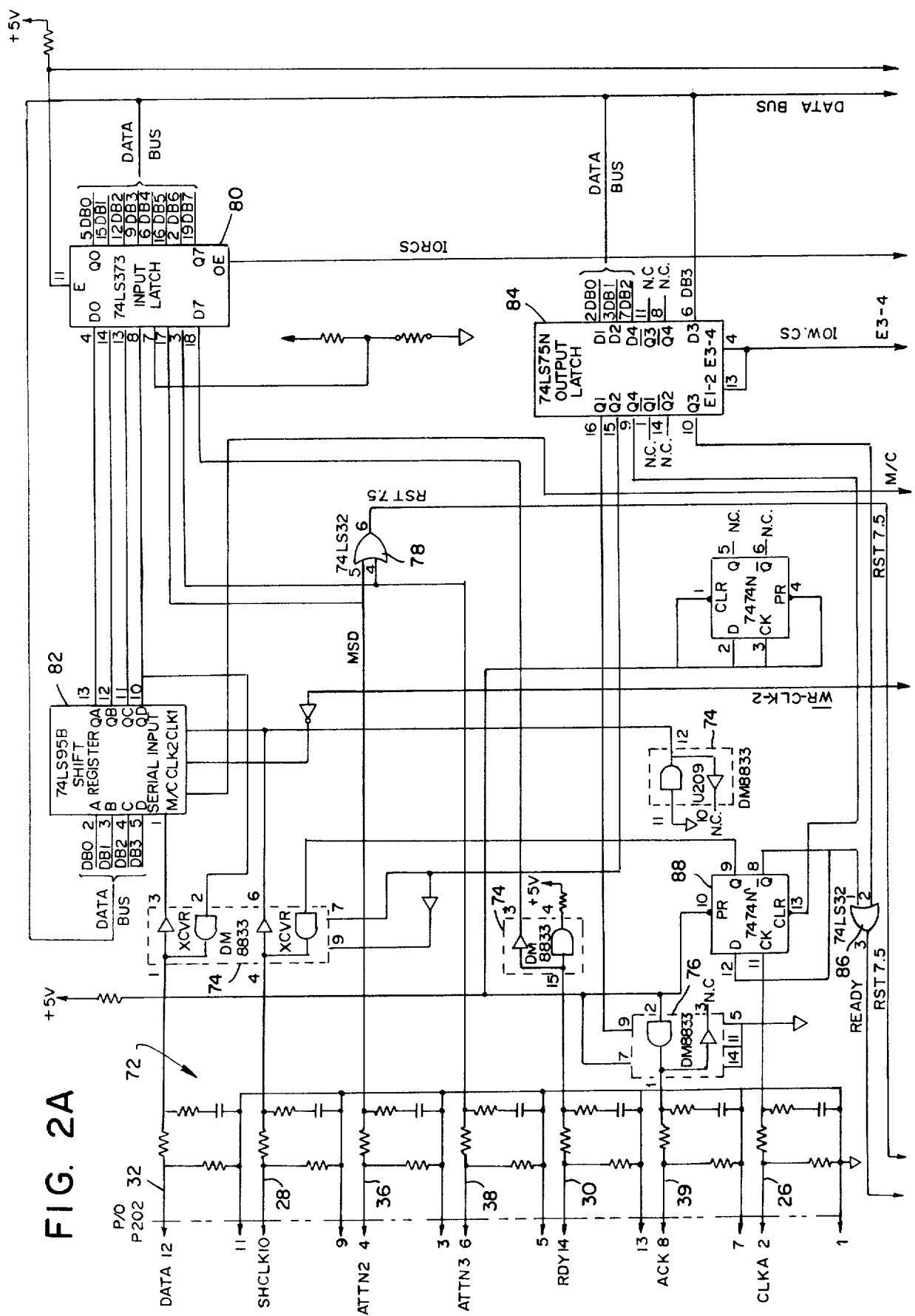
FIGS. 2A and 2B comprise a composite schematic illustration of the incompatible systems interface circuit with the placement of FIG. 2A being directly above FIG. 2B for circuit continuity.

Referring now to FIG. 2A wherein a portion of the schematic diagram of the incompatible systems interface circuit is shown, the incompatible systems interface 40 is employed to receive signals along the system clock line 26. The shift clock (SHCLK) line 28, the ready (RDY) line 30 and the data line 32 are bidirectional lines which interconnect to the circuit of the interface 40. In addition, the systems interface 40 receives signals along the ATTN 2 line 36 originally designed to be directed to a postage printer processor and the ATTN 3 line 38 originally designed to be directed to a peripheral subsystem processor as described in application Ser. No. 13,734. The acknowledge (ACK) line 39 is also connected to the systems interface 40. The system processor 12 receives an ACK signal in response to an ATTN signal.

The incompatible systems interface 40 includes a processor 58 (FIG. 2B) which may comprise an Intel 8085 microprocessor. The processor 58 includes an internally multiplexed address/data port which is interconnected to a transceiver latch 60 and an address latch 62. A further address latch 64 is connected to an address port. The latches 62, 64 are employed to address storage locations at a program memory 66 which may comprise an eraseable programmable read only memory (EPROM). A decoder PROM 68 employed to select outputs is also addressed through the latches 62, 64. The program stored in the program memory 66 appears on a DATA BUS and is employed by the processor 58. The processor 58 utilizes a random access memory 70 as a working memory. The memory 70 is interconnected to the DATA BUS for addressing and reading stored data, as well as for entering data.

Returning again to FIG. 2A, when the system processor 12 wishes to transmit data to a selected peripheral device, it raises the appropriate attention signal on the communications serial bus. The ATTN 2 is raised if the system processor wishes to communicate with a postage printing subsystem processor of a meter setting device. The interface 40 responds in simulation of such subsystem processor, while in actuality the appropriate data will be formatted by the processor 58 and transmitted to the peripheral controller interface 56 which communicates in Echoplex with the electronic postage meters 42, 44.

In the event the system processor 12 wishes to communicate with a peripheral device other than the meter setting device, the ATTN 3 signal is raised. The systems interface 40 will respond in simulation of a peripheral subsystems processor while in actuality the interface processor 58 will format and then transmit the communication to the peripheral controller interface 56 which, in turn, will communicate with a desired peripheral device in either Echoplex or through an RS 232 interface.

The circuit board of the interface 40 includes a suitable termination network 72 adjacent the pin connections to the serial communications bus for buffering the incoming and outgoing signals between the interface and the serial communications bus. As illustrated, the termination network may include suitable resistors and capacitors to ground.

After the termination network 72, the bidirectional data line 32, shift clock line 28, and ready line 30 each extend through one stage of a tri-state line transceiver circuit 74. In addition, the acknowledge line 39 extends through one stage of a further transceiver 76. The transceivers 74, 76 serve as signal amplifiers.

A raised signal level on either attention line 36, 38 provides a signal to an interrupt control (RST 7.5) of the processor 58 through an OR gate 78. In addition, the signal on the attention lines 36, 38 appears at input pins of a bidirectional input latch 80.

Upon receipt of the signal on its interrupt control (RST 7.5) the processor 58 transmits a high signal on the acknowledge line 39 by writing a word in and enabling an output latch 84 which actuates the transceiver 76. Additionally the processor 58 examines the input latch 80 to determine which of the attention lines is high.

The interface 40 receives a serial data transmission along the serial data bus 32 at a shift register 82, the output of which appears on the input latch 80 and is read by the processor 58 through the DATA BUS. Upon detection of a lowered RDY signal at the input latch 80, the processor reads the data word received.

In order to transmit data to the system processor 12 through the serial data bus 32, the data to be transmitted is loaded, one bit at a time, into the shift register 82 through the DATA BUS.

Figure 4:
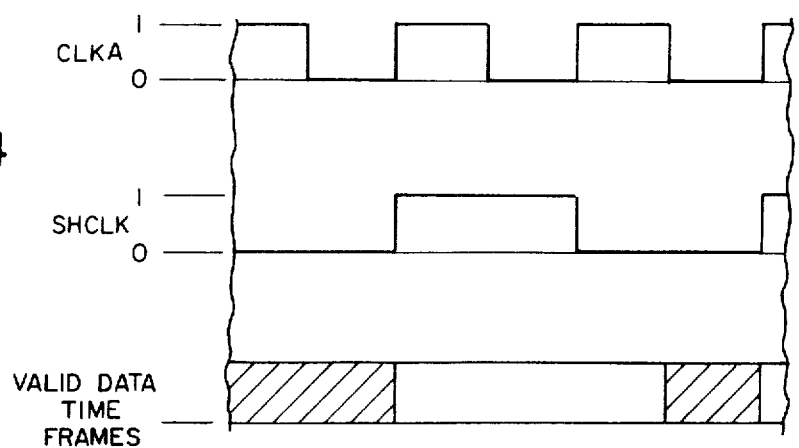
FIG. 4 illustrates clock wave forms along the serial bus and shows the relationship between the signals of a system clock and a data shifting clock, as well as corresponding valid data transfer frames.

FIG. 4 illustrates the relationship between the system clock signal CLKA and the data shifting clock signal SHCLK. The frequency of the system clock signal CLKA is twice the frequency of the SHCLK signals, i.e. ten microseconds. The SHCLK signals go high at the leading edge of the one CLKA pulse and return low at the leading edge of the following CLKA pulse. While the SHCLK pulse is synchronous relative to the system clock, the system clock can be asynchronous.

The two clock pulses taken together define a valid time frame during which data can be transferred to or from the system processor 12 (shown in FIG. 4 as unshaded blocks). The processor 58 cannot monitor the CLKA signal due to its inherent software delay, i.e. the average instruction execution time of the processor 58 is approximately three microseconds. The system processor generated CLKA signal is employed to disable the processor during a SHCLK time frame after which the processor 58 resumes its data transmission subroutine.

To transmit, the processor 58 writes a control word into the output latch 84 which allows the rising edge of the next incoming CLKA pulse to disable the processor. The serial data bus 32 will receive the data signal appearing at the output QD of the shift register 82, which signal is amplified by the transceiver 74. Controlling the transceiver 74 is the signal appearing on the Q2 output pin of the output latch 84. The output latch signal at Q2 also provides a raised outgoing signal on the serial ready line 30 by switching a stage of the transceiver 74 to interconnect the ready line 30 with a positive potential.

The signal at a further output pin Q4 of the latch 84 appears at a CLR input of a flip-flop 88, the clock input of which is the system clock CLKA. The Q and $\overline{Q}$ output pins of the flip-flop 88 will toggle at the system clock frequency of five microseconds. On the first rising edge of a CLKA signal, the Q output goes high and the $\overline{Q}$ output goes low. It should be noted that the Q output of of the flip-flop 88 is interconnected to the SHCLK line 28 through the transceiver 74 and that the transceiver 74 is in a transmitting state as determined by the signal applied by the output latch 84.

Since the Q output of the flip-flop 88 is high, the SHCLK signal transmitted from the interface 40 to the system processor 12 will go high and the data on the QD output of the shift register 82 and appearing on the data bus 32 is read by the system processor. It should be noted that the $\overline{Q}$ output of the flip-flop 88 is connected to an input of an OR gate 86. The other OR gate input is connected to the QB output pin of the latch 84 which was switched low by the control word. Upon the first rising edge of the CLKA signal, the signal at $\overline{Q}$ goes low which lowers the signal to the READY pin of the processor 58, disabling the processor 58. With a low READY, the processor 58 will wait a number of its own clock cycles for READY to go high before completing a read or write cycle.

Upon the next incoming CLKA pulse, the flip-flop $\overline{Q}$ signal goes high and the processor 58 is enabled. Upon becoming enabled, the processor 58 transmits a control word to the output latch 84 to disable the flip-flop 88 thereby preventing the next incoming CLKA signal from disabling the processor. The processor 58 thereafter proceeds with transmitting the next bit of a four bit data byte to the shift register 82. In addition, the control word provides a high signal level at the output latch QB Pin to prevent inadvertent lowering of the READY line.

Figure 6:
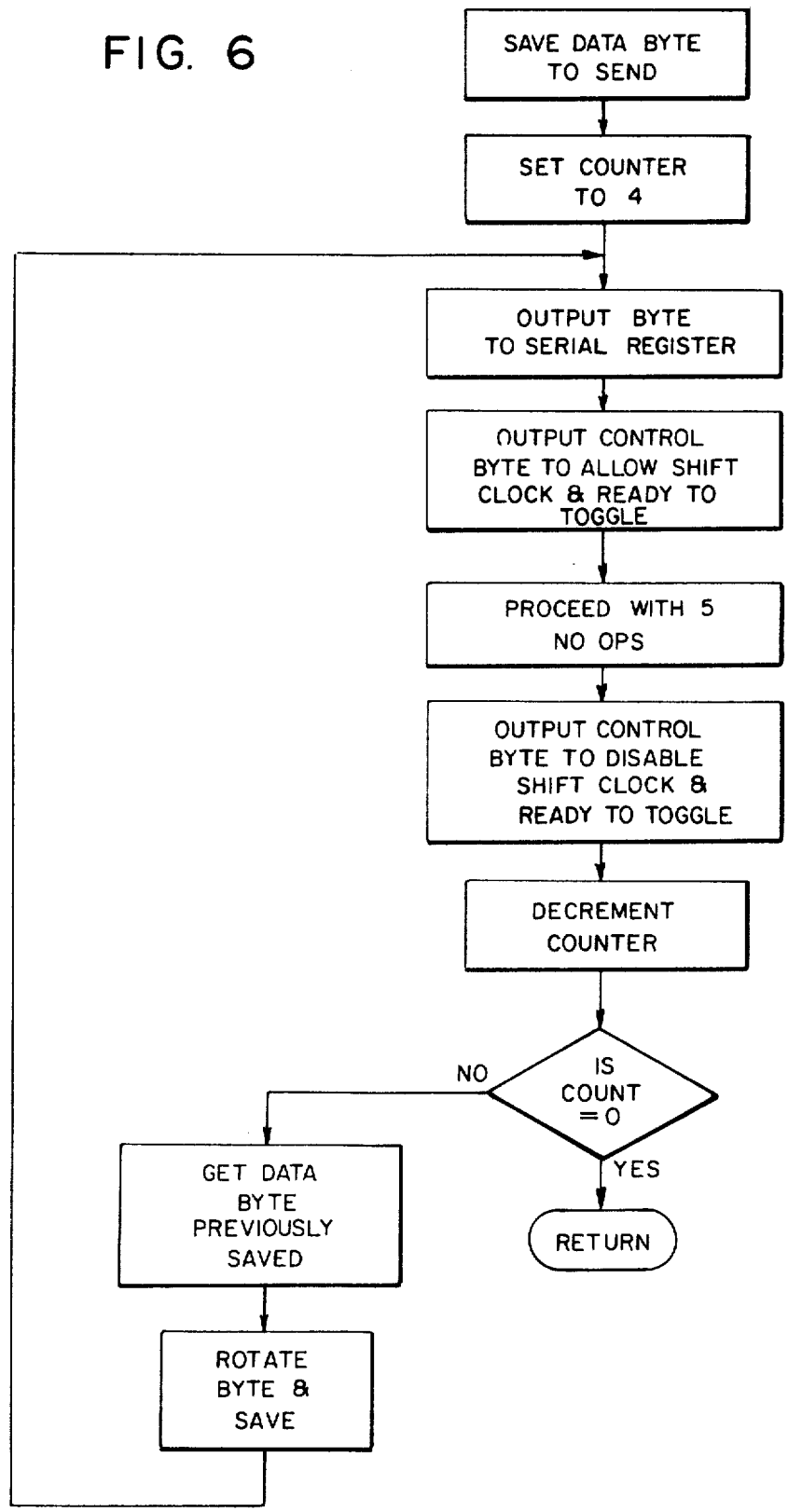
FIG. 6 is a flow chart illustrating the manner in which the incompatible systems interface processor transmits a message to the serial bus employing the processor ready line as a counter.

Illustrated in FIG. 6 is a typical flow chart of the procedure employed in data transmission to the serial data bus. The routine illustrated indicates the steps of saving the four bit data word which is to be transmitted and setting a counter to 4. Thereafter, the program proceeds with outputting the first bit of the four bit data word to the serial register 82 as a four bit byte, each bit comprising the same logic level. Subsequently, a control byte is transmitted to the output latch 84 which enables the flip-flop to toggle the ready line on the next sequential CLKA rising edge. Simultaneously, the output latch 84 provides appropriate signals to the transceiver 74 to output a SHCLK signal pulse generated by the CLKA signal through the flip-flop 88 and output the first bit of the word which has been loaded in the shift register through the DATA BUS. The transceiver 74 also outputs a RDY pulse.

The program then proceeds with five NO OPS while awaiting the incoming CLKA pulse which will toggle the ready line through the flip-flop. Upon the processor 58 being enabled by the next CLKA incoming pulse, the program transmits a control byte to the output latch 84 to disable the flip-flop 88 prior to the next incoming CLKA pulse. Thereafter, the counter is decremented and a determination is made as to whether or not the counter has been completely decremented; if not, the next sequential bit of the four bit data word is loaded as a byte into the serial register 82 and the program repeats until all four bits of the data word have been transmitted.

Figure 3:
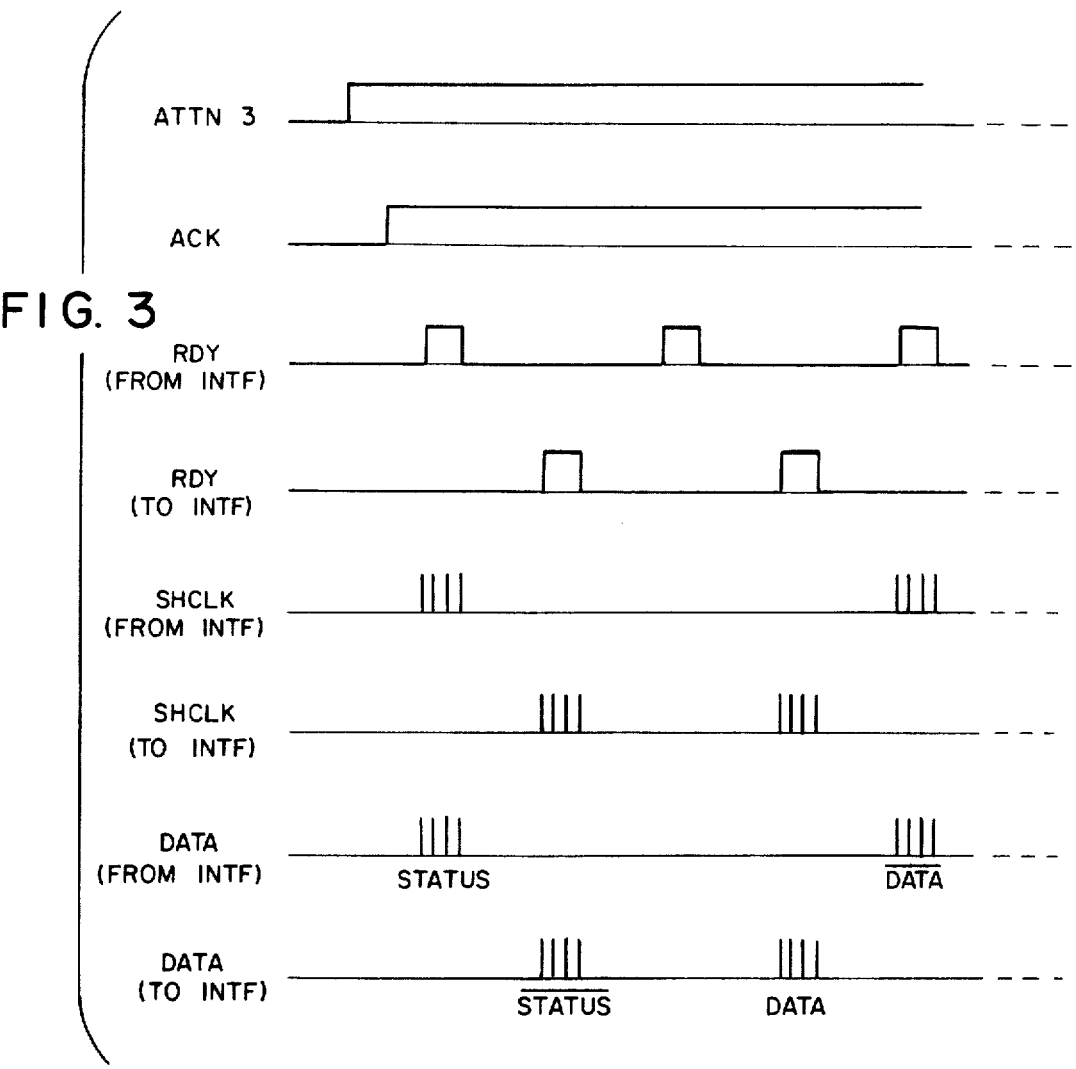
FIG. 3 is an illustration of signal wave forms along a serial data bus of the system processor and which would be generated during the initial phases of an exchange of data between the system processor and the incompatible systems interface.

Wave forms generated in a data exchange between the system processor and a peripheral subsystem processor are shown in FIG. 3. As indicated, the system processor initially raises the attention signal ATTN 3 on the line 38. The interface 40 raises the signal on the acknowledge line 39 and thereafter transmits a four bit status word to the system processor 12 in accordance with the routine described while simultaneously raising the signal on the ready line 38.

The system processor 12 retransmits the complement of the received status word to the processor 58 where it is compared to the originally transmitted word. In communications with the interface 40, data generally is transmitted from the system processor to the interface 40 and the interface 40 returns a ready pulse (RDY) to the system processor 12 to indicate receipt of the proper complement of the status word. Upon a detection of the ready pulse (RDY), the system processor 12 transmits the first four bit data word or four bit command on the serial data bus 32.

The peripheral controller interface 56 employs a processor such as an Intel 8741 as more fully described in the copending application entitled Postage Scale Peripheral Interface. With the peripheral controller interface board and the incompatible systems interface board interconnected in a mailing system, the peripheral controller interface receives parallel loaded data through the DATA BUS of the interface 40.

In addition, the decoder latch 60 may be employed by the processor 58 to address a communications formatting and/or a working memory carried on the peripheral controller interface 56 as described in a further copending application of Daniel F. Dlugos et al. entitled Mailing System Peripheral Interface with Communications Formatting Memory, Ser. No. 235,252, filed Feb. 17, 1982, assigned to the assignee of the present invention and incorporated herein by reference. For this purpose, the interface 40 board pins designated AB 0 through AB 15 (illustrated in FIG. 2B) are employed. Additionally, the processor 58 is interconnected to the peripheral controller interface with lines extending to the RESET OUT, RST 6.5, RST 5.5 $\overline{\text{INTA}}$ and INTR terminals of the processor 58.

Figure 2B:
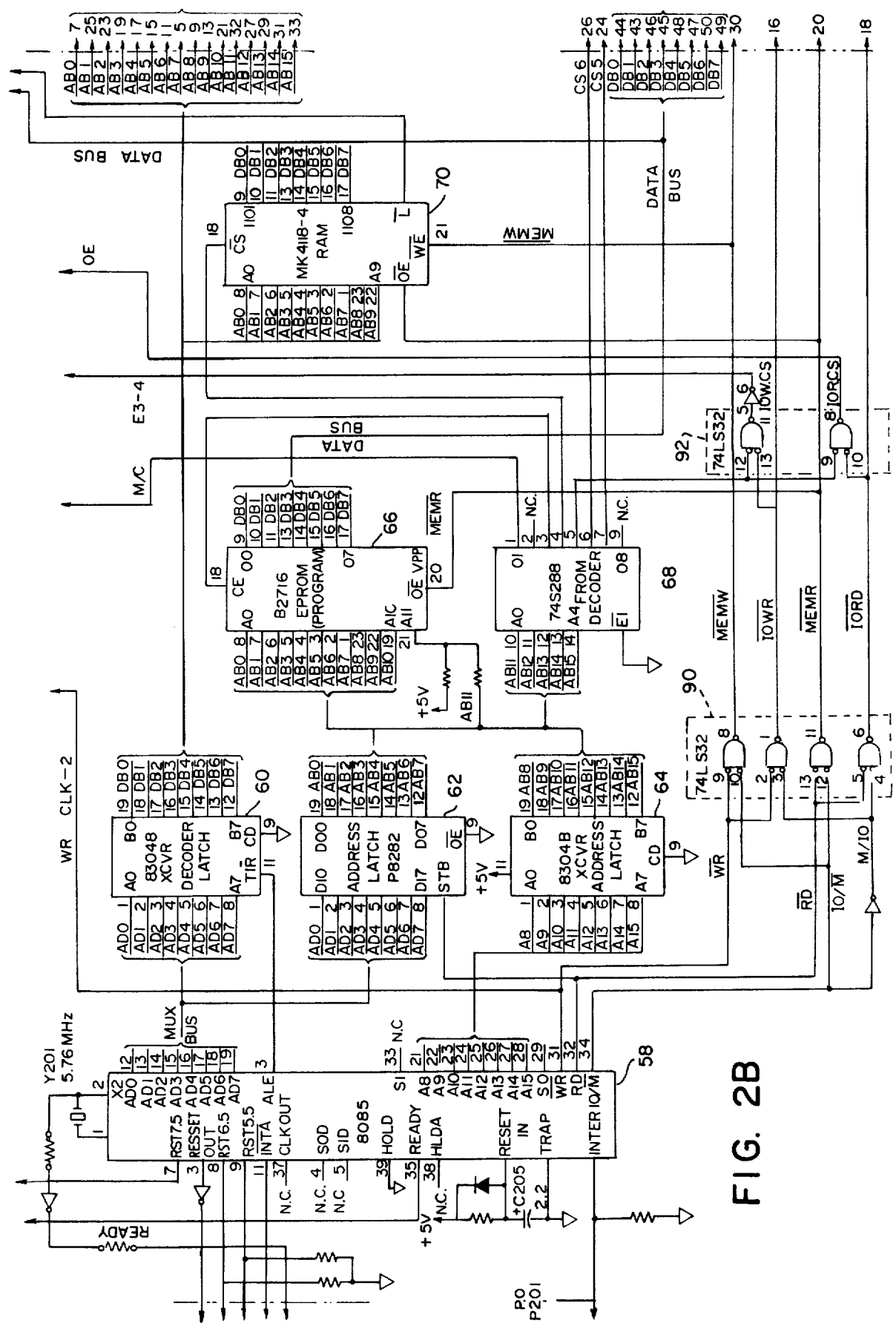

The command signals $\overline{\text{MEMW}}$, $\overline{\text{IOWR}}$, $\overline{\text{MEMR}}$ and $\overline{\text{IORD}}$ for the peripheral controller interface processor 15 are provided through lines extending from the $\overline{\text{WR}}$, $\overline{\text{RD}}$, IO/$\overline{\text{M}}$ terminals of the processor 58. As illustrated in FIG. 2B, the command signal lines extend initially through a gate 90 where the signals appearing on the terminals of the processor 58 are decoded into I/O reads and writes and memory reads and writes. A further multiple gate 92 receives the command signals along with an output of the decoder PROM 68 to provide an output enable signal for the input latch 80 and an I/O read signal for the output latch 84.

Figure 5:
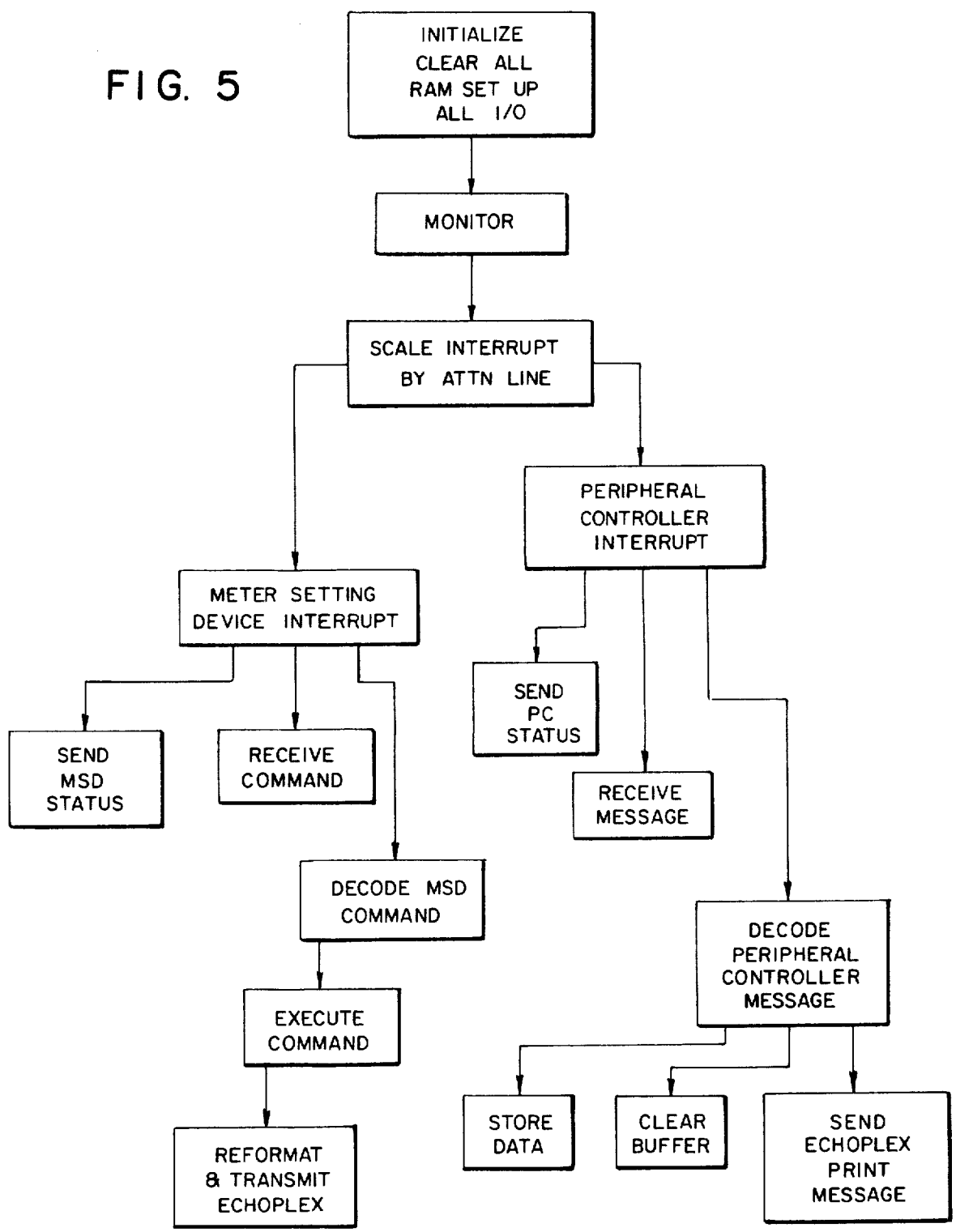
FIG. 5 is a program structure chart for a processor of the incompatible systems interface.

In FIG. 5 a structure chart for the processor 58 is depicted. Generally illustrated are the functions of the processor 58 in monitoring the serial communications bus from the system processor 12 and determining whether a meter setting device attention signal (ATT 2) or a peripheral controller attention signal (ATT 3) has been transmitted. With respect to each attention signal, the chart indicates the functions of the processor in implementing the desired communication.

If the communication is intended for a meter setting device, the processor 58 initially sends a status signal as previously described. It then receives a command message from the system processor and decodes and formats the command. The appropriate data and signals are transmitted to the peripheral controller interface 56 which in turn establishes a communications link with the electronic postage meter.

As previously mentioned, the peripheral controller interface 56 may include program and working memory to be employed by the processor 58. The program memory comprises suitable programs for formatting the data for communication with the desired peripheral, e.g. electronic postage meter. The commands are formatted by the processor 58 and transmitted to the data port and control inputs of the peripheral controller interface processor which in turn establishes the appropriate communications links and communicates with the electronic postage meter employing the Echoplex routine and protocol.

If the system processor desires to establish a communications link with a different peripheral device, the processor 58 initially transmits a peripheral controller status word. It then receives the message from the serial data bus, decodes the message and reformats the message if necessary. The appropriate command is then executed.

A program listing for the interface processor 58 in communications between the system processor and the peripheral controller interface in actuating an electronic postage meter is appended hereto. The program listing, although part of the file, has not been printed.

It should be understood that, as employed herein, the terms mail and postage relate not only to governmental postal services and charges for such services but also to nongovernmental transport services including common carriers and private carriers and transportation charges imposed by such entities.

It should also be appreciated that the present invention should not be construed with reference only to the peripheral devices illustrated herein in an exemplary manner, nor should it be construed only with reference to a plurality of peripheral devices. For example, a composite mailing system may be provided which employs the serial communications bus for communicating with a peripheral subsystem processor in accordance with copending application Ser. No. 13,734 while also employing an electronic postage meter, the peripheral controller interface 56 and the incompatible systems interface 40 for communications between the system processor and the electronic postage meter. Under such circumstances, the attention line 38 for the ATTN 3 signal would not extend into the incompatible systems interface 40 but would be coupled to the peripheral subsystem processor. Numerous variations and permutations in composite automated mailing systems should be apparent to those of skill in the art.

Thus, it will be seen that there is provided a mailing system interface which achieves the various objects of the invention and is well suited to meet the conditions of practical use.

As various changes might be made in the interface and mailing system as set forth herein, it is to be understood that all matter herein described of shown in the accompanying drawings is to be interpreted as illustrative and not in a limiting sense.

Having thus described the invention, there is claimed as new and desired to be secured by Letters Patent:

1. A systems interface between a mailing system processor which communicates in a specific format along a serial communications bus and controller means which established communications links with selected mailing system peripheral devices, the controller means receiving data and commands along parallel lines in accordance with a different format, the specific format and the different format being incompatible, the interface operatively interconnecting the serial communications bus and the controller means, the interface comprising means for receiving data signals from the serial communications bus, the data signal receiving means including register means for storing and grouping serially transmitted data signals, said register means comprising a shift register, processing means, means interconnecting the register means and the processing means for transmitting the grouped data signals to the processing means, the processing means including means for transmitting the grouped data signals to the controller means.

2. A systems interface in accordance with claim 1 wherein the serial communications bus comprises a data line and communications control signal lines, the interface further including control signal register means, means interconnecting a plurality of control signal lines and the control signal register means, the interface further including means interconnecting the control signal register means and the processing means for transmission of the control signals to the processing means.

3. A systems interface in accordance with claim 2 wherein the control signal register means comprises a latch.

4. A systems interface in accordance with claim 1 wherein the serial communications bus comprises a serial data line, an attention signal line and an acknowledge signal line, the interface further including means interconnecting the attention signal line and the processing means, the processing means receiving the attention signal and, in response thereto, transmitting an acknowledgment control signal to the mailing system processor on the acknowledge signal line.

5. A systems interface in accordance with claim 1 further including register means for data transmission, means interconnecting the processing means and the register means, means selectively interconnecting the data transmit register means and the communications bus, the interconnecting means including switch means, the processing means generating a signal operable to actuate the switch means to transmit the data on the data transmit register means through the serial communications bus.

6. A systems interface in accordance with claim 5 further including output latch means, means interconnecting the processing means and the output latch means, the signal for actuating the switch means being received by the output latch means, the output latch means transmitting a control signal to the switch means in response thereto.

7. A systems interface in accordance with claim 5 wherein the switch means comprises a transceiver.

8. A systems interface in accordance with claim 5 wherein the register means and the data register means comprise a single shift register.

9. An automated mailing system comprising a postage scale, a system processor receiving weight data from the scale, communications means for transmitting and receiving information operatively connected to the system processor, the communications means including a serial communications bus, at least one mailing system peripheral device, and controller means for establishing communications with the one peripheral device, the controller means including means for receiving data and commands from a system processor in a parallel loaded format, the mailing system further including an incompatible systems interface, the interface being operatively connected between the serial communications bus and the controller means, the interface comprising processing means, memory means, means for storing information received from the system processor, the processing means retrieving the stored information and transmitting the retrieved information to the controller means in a parallel loaded format compatible with the controller means.

10. An automated mailing system in accordance with claim 9 further including a plurality of peripheral devices operatively interconnected to the controller means.

* * * * *